United States Patent
Knoblauch

(10) Patent No.: US 9,148,041 B2
(45) Date of Patent: Sep. 29, 2015

(54) ELECTRIC MACHINE HAVING A COOLED ROTOR SHAFT

(71) Applicant: Dr. Ing. h.c. F. Porsche Aktiengesellschaft, Stuttgart (DE)

(72) Inventor: Daniel Knoblauch, Ludwigsburg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/269,612

(22) Filed: May 5, 2014

(65) Prior Publication Data
US 2014/0333161 A1 Nov. 13, 2014

(30) Foreign Application Priority Data
May 7, 2013 (DE) .......................... 10 2013 104 711

(51) Int. Cl.
*H02K 9/197* (2006.01)
*H02K 1/32* (2006.01)
*H02K 9/19* (2006.01)

(52) U.S. Cl.
CPC .................. *H02K 9/197* (2013.01); *H02K 1/32* (2013.01); *H02K 9/19* (2013.01)

(58) Field of Classification Search
CPC ....................................................... H02K 1/32
USPC ..................... 310/83, 89, 61, 60 A
See application file for complete search history.

(56) References Cited

U.S. PATENT DOCUMENTS

| | | | | |
|---|---|---|---|---|
| 4,358,937 A * | 11/1982 | Okamoto et al. | | 62/505 |
| 4,364,241 A * | 12/1982 | Okamoto et al. | | 62/505 |
| 5,019,733 A * | 5/1991 | Kano et al. | | 310/61 |
| 5,394,040 A | 2/1995 | Khanh | | |
| 6,657,333 B2 * | 12/2003 | Shoykhet et al. | | 310/61 |
| 7,944,106 B2 | 5/2011 | Miller et al. | | |
| 8,653,704 B2 | 2/2014 | Atarashi et al. | | |
| 2004/0080218 A1* | 4/2004 | Weidman et al. | | 310/61 |
| 2004/0145252 A1 | 7/2004 | Arimitsu et al. | | |
| 2010/0164310 A1* | 7/2010 | Dames et al. | | 310/54 |
| 2010/0264759 A1* | 10/2010 | Shafer et al. | | 310/54 |

FOREIGN PATENT DOCUMENTS

EP 0 660 492 6/1995

* cited by examiner

*Primary Examiner* — Naishadh Desai
(74) *Attorney, Agent, or Firm* — Gerald E. Hespos; Michael J. Porco; Matthew T. Hespos

(57) ABSTRACT

An electric machine (1) has a hollow rotor shaft (3) and a stationary cooling lance (13) that penetrates the hollow shaft (3) axially. The cooling lance (13) has an inlet (16) and an outlet (17) for a cooling medium. A cooling duct (18) penetrates the cooling lance (13) axially and is connected to the inlet (16) and the outlet (17) for guiding the cooling medium through the cooling lance (13). The cooling lance (13) also has an inlet (24) and an outlet (25) for oil. An oil duct (26) penetrates the cooling lance (13) axially and is connected to the oil inlet (24) and outlet (25) for guiding the oil through the cooling lance (13). The outlet (25) for the oil is connected to an annular space (27) between the cooling lance (13) and the rotor shaft (3). The annular space (27) has an opening (28) for the oil.

17 Claims, 1 Drawing Sheet

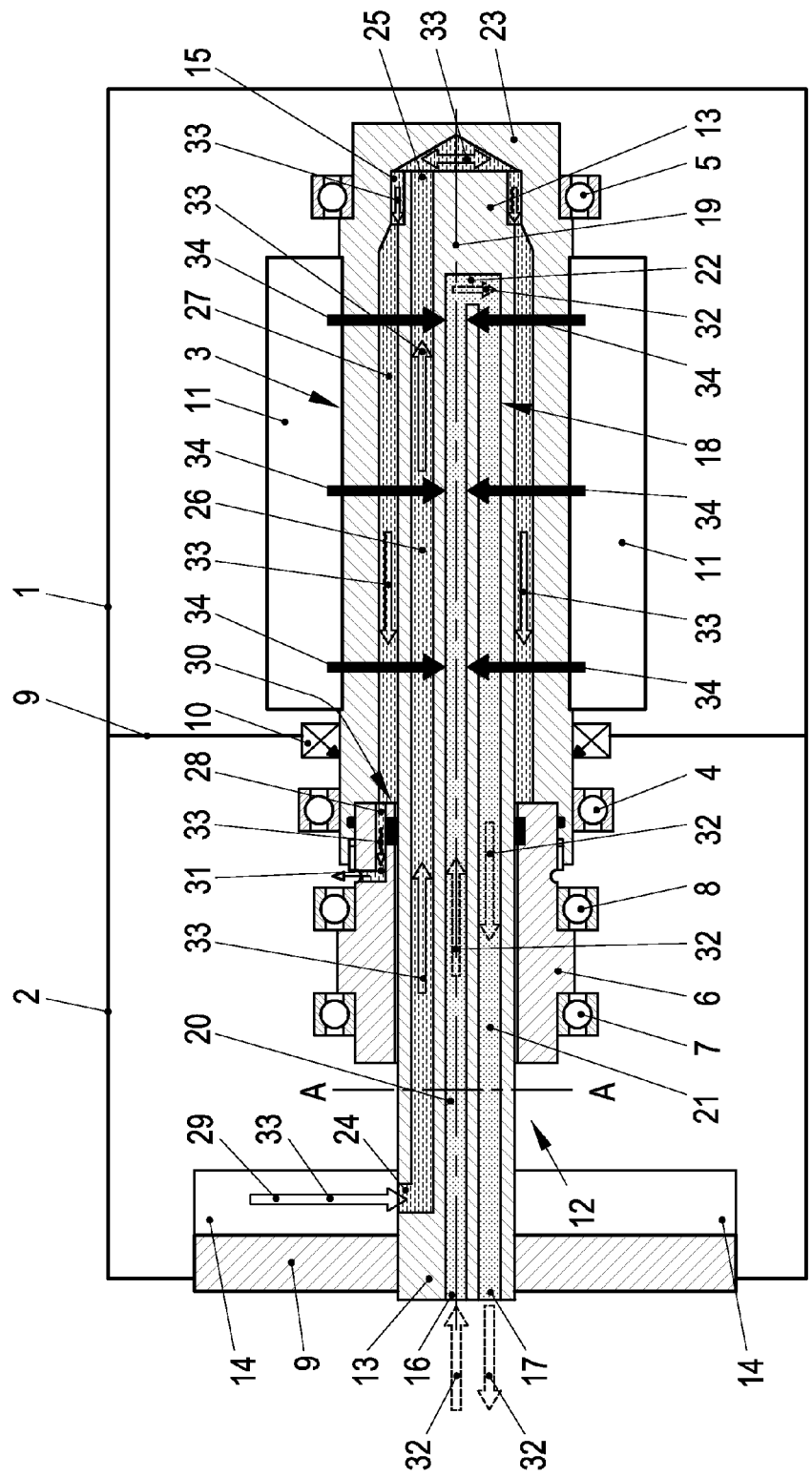
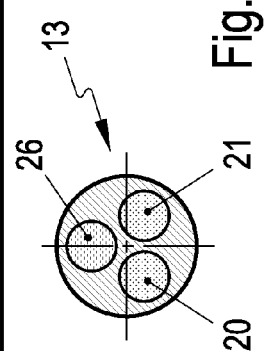
Fig. 1
Fig. 2

ELECTRIC MACHINE HAVING A COOLED ROTOR SHAFT

CROSS REFERENCE TO RELATED APPLICATION

This application claims priority under 35 USC 119 to German Patent Appl. No. 10 2013 104 711.4 filed on May 7, 2013, the entire disclosure of which is incorporated herein by reference.

BACKGROUND

1. Field of the Invention

The invention relates to an electric machine having a hollow rotor shaft and a device for cooling the rotor shaft.

2. Description of the Related Art

EP 0 660 492 A1 discloses an electric machine with a rotor shaft that is cooled by transmission oil of a transmission. The transmission has an input gearwheel connected fixedly to the rotor shaft so as to rotate with it. Transmission oil is guided from a gearbox into the rotor shaft as coolant and is returned from the rotor shaft back into the gearbox.

The cooling of the rotor shaft of EP 0 660 492 A1 disadvantageously is dependent on the volumetric flow and on the temperature of the transmission oil and the transmission oil heats up during the passage through the rotor shaft. Furthermore, special seals are needed in the region of the rotor shaft that guides the transmission oil.

It is an object of the invention to provide an electric machine with a hollow rotor shaft that achieves optimum cooling of the rotor shaft and optimum oil routing in the region of the rotor shaft, without substantial heating of the oil.

SUMMARY OF THE INVENTION

The invention relates to an electric machine having a hollow rotor shaft and a cooling device with a stationary cooling lance that penetrates the hollow shaft axially. A cooling duct penetrates the cooling lance axially and has an inlet and an outlet for guiding a cooling medium through the cooling lance. An oil duct also penetrates the cooling lance axially and has an oil inlet and an oil outlet for guiding the oil through the cooling lance. The outlet being is connected to an annular space which between the cooling lance and the rotor shaft. The annular space having an opening for the oil.

The oil functions to lubricate the region of the rotor shaft and the cooling medium functions to cool the rotor. Heat transmitted to the rotor shaft from the hot rotor laminations that bear against the rotor shaft can be discharged by the cooling medium. Accordingly, the oil merely functions as a heat bridge between the rotor and the cooling medium. Thus, cooling that is independent of the volumetric flow and the temperature of the oil is possible, and seals may be omitted in the rotor shaft region. Water may be provided as coolant of normal stator cooling of the electric machine.

The cooling lance preferably is mounted in a transmission housing. The transmission housing may have a housing fin with an oil duct that is connected to the oil inlet of the cooling lance.

The cooling lance may penetrate the transmission housing to the outside and has the cooling duct inlet and cooling duct outlet on the outer side of the transmission housing. This makes simple connection of the cooling circuit to the cooling lance possible.

The cooling duct preferably has first and second duct sections arranged in the direction of the axis of the rotor. The first duct section has the cooling duct inlet and the second duct section has the cooling duct outlet in the region of the same end of the cooling lance. The two duct sections are connected to one another by a connecting duct section at their ends that face away from the cooling duct inlet and cooling duct outlet. Cooling medium is conveyed via the cooling duct inlet into the first duct section, from there to the connecting duct section and on to the second cooling duct section and the cooling duct outlet. The stationary mounting of the cooling lance enables simple sealing of the cooling medium in the region of the cooling duct inlet and the cooling duct outlet.

The cooling duct preferably extends over substantially the entire axial length of the cooling lance. Accordingly, the cooling medium cools the cooling lance over substantially its entire axial length.

The rotor shaft preferably is closed at one axial end and is open only at the other end. Thus, the cooling lance can be plugged into the rotor shaft via the end.

The cooling lance preferably penetrates the rotor shaft over substantially its entire axial length and is guided close to the closed axial end of the rotor shaft.

The cooling lance preferably has a structurally simple cylindrical configuration. The oil duct and the cooling duct can be introduced into this cooling lance in a particularly simple manner. Of course, other configurations of the cross sections of cooling lance and/or oil/cooling duct are possible. For example, the shape of the cooling lance can be optimized with regard to flow behavior and/or heat transfer.

The rotor shaft of the electric machine typically interacts with a gearwheel of a transmission and is connected to a transmission shaft that has the gearwheel. The rotational axes of the transmission shaft and the rotor shaft preferably are identical.

The cooling lance is an elongate component and may be supported at both ends in the transmission housing. Additionally, the cooling lance advantageously is mounted via a bearing in the rotor shaft in the region of its end that faces away from the stationary mounting or the transmission housing.

The oil duct that penetrates the cooling lance preferably is parallel to the two duct sections of the cooling duct that are arranged in the axial direction of the rotor.

The opening in the annular space is for discharging oil from the annular space. This opening for discharging oil can be designed in different ways. For example, the discharge opening for the oil from the annular space may be configured as a build-up step. The build-up step may be formed by a transition of the annular space to an oil duct that penetrates the transmission shaft, preferably to an oil duct that opens in a region of the bearing and/or a radial shaft seal.

The cooling lance preferably has measures or devices for oil routing and for guiding a cooling medium. Oil may be conveyed by an oil pump from the transmission via the cooling lance into the hollow shaft of the electric machine or, in the case of splash lubrication, oil may be conveyed by corresponding oil routing. A build-up step and/or seals enable the annular gap between the rotor of the electric machine and the cooling lance to be filled with oil and the rotor is connected thermally to the cooling lance as a result. A cooling liquid flows through and cools the cooling lance. On account of the rotational movement of the rotor shaft, the build-up step leads to homogeneous (as viewed in the axial direction) wetting of the surface of the oil distributor with oil. Heat in the rotor can therefore be discharged via the annular oil gap, the cooling lance and the cooling medium.

The oil serves primarily for heat transfer. The oil then participates in the heat discharge partially, in accordance with the respective oil volumetric flow.

The heat transport via the cooling lance achieves a lower oil temperature in the rotor interior, even in the case of a low oil volumetric flow.

The oil that comes from the rotor can be used for lubricating components of the electric machine and/or the transmission at the interface of rotor shaft and transmission. The comparatively low oil temperature advantageously is lower than the temperature of the rotor shaft.

Unlike known electric machines with a cooled rotor shaft, no rotating seals, such as radial shaft seals and the like, are required for the cooling system.

Circulating seals for the cooling medium, as are required in known hydraulic cooling systems for rotor interior cooling, can be dispensed with.

Further features of the invention will become apparent from the appended drawing and the description of the preferred exemplary embodiment reproduced in the drawing, without being restricted hereto.

BRIEF DESCRIPTION OF THE DRAWINGS

FIG. 1 shows a longitudinal center section for a region of an electric machine and a transmission that interact.

FIG. 2 is a section through the cooling lance in the region of the line A-A.

DETAILED DESCRIPTION OF THE PREFERRED EMBODIMENT

The region of an electric machine 1 and the region of a transmission 2 that interacts directly with the electric machine 1 are illustrated diagrammatically.

The electric machine 1 has a hollow rotor shaft 3 with opposite ends mounted in anti-friction bearings 4 and 5. The rotor shaft 3 is open in the region of the anti-friction bearing 4 and is closed in the region of the anti-friction bearing 5. The open end of the rotor shaft 3 is connected to a transmission shaft 6 that is mounted in anti-friction bearings 7 and 8. A transmission housing 9 of the transmission 2 is sealed toward the electric machine 1 via a radial shaft seal 10.

The electric machine 1 has rotor laminations 11 that heat up during operation of the electric machine 1 and bear against the rotor shaft 3. The rotor shaft 3 therefore heats up via the rotor laminations 11.

The electric machine 1 has a cooling device 12 for cooling the rotor shaft 3. The cooling device 12 has a stationary cooling lance 13 that is mounted in the transmission housing 9 and penetrates the transmission housing 9. The transmission housing 9 has a housing fin 14, at least in the region of the cooling lance 13.

The cooling lance 13 is cylindrical and penetrates the hollow rotor shaft 3 axially. The end of the cooling lance 13 is mounted via a bearing 15 in the end of the rotor shaft 3 remote from the cooling fin 14.

The cooling lance 13 has an inlet 16 and an outlet 17 for a cooling medium. The coolant preferably is a cooling liquid, such as water, in the case of normal stator cooling of the electric machine. A cooling duct 18 penetrates the cooling lance 13 axially and is connected to the inlet 16 and the outlet 17. The cooling duct 18 functions to guide the cooling medium through the cooling lance 13.

More particularly, the cooling duct 18 has first and second duct sections 20 and 21 that are arranged in the direction of the axis 19 of the rotor shaft 3 and transmission shaft 6. Furthermore, a connecting duct section 22 connects ends of the first and second duct sections 20 and 21 that face a bottom 23 of the rotor shaft 3. The cooling duct 18 therefore extends over substantially the entire axial length of the cooling lance 13. The cooling lance 13 penetrates the rotor shaft 3 over substantially its entire axial length.

The cooling lance 13 also has an inlet 24 and an outlet 25 for transmission oil. An oil duct 26 penetrates the cooling lance 13 and is connected to the oil inlet 24 and the oil outlet 25 for guiding the oil through the cooling lance 13. The outlet 25 is connected to an annular space 27 between the cooling lance 13 and the rotor shaft 3. The annular space 27 or annular gap has an opening 28 for the oil.

The housing fin 14 has an oil duct 29 that is connected to the oil inlet 24 of the cooling lance 13.

The oil duct 26 that penetrates the cooling lance 13 is parallel to the first and second duct sections 20 and 21 that are arranged in the axial direction of the rotor shaft 3. The arrangement of the duct sections 20 and 21 with regard to the oil duct 26 is illustrated in FIG. 1 to explain the function of the electric machine having a cooling device. The exact arrangement of the two cooling sections 20 and 21 and the oil duct 26, in relation to the cross section of the cooling lance 13 is illustrated in FIG. 2.

The opening 28, through which oil is discharged from the annular space 27, is formed by a build-up step 30. The build-up step 30 is formed by the transition of the annular space 27 to an oil duct 31 that penetrates the transmission shaft 3 and opens in a region of the anti-friction bearing 8 and/or a radial shaft seal.

The cooling lance 13 therefore has measures or devices for oil routing and for guiding the cooling medium or the cooling liquid. Oil is conveyed or pumped via the cooling lance 13 from the transmission 2 into the hollow rotor shaft 3 of the electric machine 1. This can take place by means of an oil pump or, for example in the case of splash lubrication, by means of corresponding oil routing. The build-up step 30 and/or seals or sealing systems enables the annular space 27 or annular gap between the rotor shaft 3 and the cooling lance 13 to be filled with oil so that the rotor shaft 3 is connected thermally to the cooling lance 13. The cooling liquid flows through the cooling lance 13. Thus, heat in the rotor shaft 3 can be discharged via the annular space 27, the cooling lance 13 and the coolant that flows through the cooling lance 13.

The oil therefore serves primarily for heat transfer. The oil participates in the heat discharge only partially, in accordance with the respective oil volumetric flow. On account of the heat transport via the cooling lance 13, the oil temperature in the interior of the rotor shaft 3 can be kept at a low level, even in the case of a low oil volumetric flow. The oil that exits the oil duct 31 has a comparatively low oil temperature and can be used for lubricating components of the electric machine and the transmission.

The arrows 32 illustrate the flow path of the cooling medium, and the arrows 33 illustrate the flow path of the oil. The arrows 34 clarify the heat discharge (cooling) by means of the cooling lance 13 and cooling medium.

What is claimed is:

1. An electric machine comprising: a hollow rotor shaft and a cooling device for cooling the rotor shaft, the cooling device including a stationary cooling lance that penetrates the hollow rotor shaft axially and mounted so that the hollow rotor shaft is rotatable about the stationary cooling lance, the cooling lance having a cooling duct inlet, a cooling duct outlet, and a cooling duct penetrating the cooling lance axially, the cooling duct being connected to the cooling duct inlet and the cooling duct outlet for guiding a cooling medium through the cooling lance, the cooling lance further having an oil inlet, an oil outlet and an oil duct penetrating the cooling lance axially, the oil duct being connected to the oil inlet and the oil outlet for guiding the oil through the cooling lance without fluid communication between the oil and the cooling medium guided through the cooling duct, the oil outlet being connected to an annular space formed between the stationary cooling lance and the rotatable rotor shaft, and the annular space having an opening disposed and configured for discharging the oil from the annular space to locations external of cooling lance and the rotor shaft.

2. The electric machine of claim 1, wherein the cooling lance is mounted in a transmission housing.

3. The electric machine of claim 2, characterized in that the transmission housing has a housing fin, the housing fin having an oil duct that is connected to the oil inlet of the cooling lance.

4. The electric machine of claim 2, wherein the cooling lance penetrates the transmission housing to the outside and has the cooling duct inlet and the cooling duct outlet on the outer side of the transmission housing.

5. The electric machine of claim 1, wherein the cooling duct has first and second duct sections arranged in the direction of the axis of the rotor shaft, the first duct section having the cooling duct inlet and the second duct section having the cooling duct outlet at a first end of the cooling lance, the first and second duct sections being connected to one another by a connecting duct section at ends opposite the cooling duct inlet and cooling duct outlet.

6. The electric machine of claim 1, wherein the cooling duct extends substantially over the entire axial length of the cooling lance.

7. The electric machine of claim 1, wherein the rotor shaft has a closed axial end.

8. The electric machine of claim 1, wherein the cooling lance penetrates the rotor shaft substantially over its entire axial length.

9. The electric machine of claim 1, wherein the cooling lance is substantially cylindrical.

10. The electric machine of claim 1, wherein a transmission shaft is connected to the rotor shaft, the rotational axis of the transmission shaft corresponding to the rotational axis of the rotor shaft.

11. The electric machine of claim 10, wherein the cooling lance is connected fixedly to the transmission housing and is mounted via a bearing in the rotor shaft in a region of the end that faces away from the transmission housing.

12. The electric machine of claim 1, wherein the oil duct that penetrates the cooling lance is parallel to the first and second duct sections.

13. The electric machine of claim 1, wherein the opening for discharging the oil from the annular space is a build-up step.

14. The electric machine of claim 13, wherein the build-up step is formed by a transition of the annular space to an oil duct that penetrates the transmission shaft and opens in a region of a bearing or a radial shaft seal.

15. The electric machine of claim 1, wherein the outlet for the oil is disposed for lubricating components of the electric machine.

16. The electric machine of claim 1, wherein the cooling medium is water.

17. The electric machine of claim 7, further comprising an axial space between the cooling lance and the closed axial end of the rotor shaft, the axial space communicating with the oil outlet and with the annular space between the stationary cooling lance and the rotatable rotor shaft for accommodating a flow of oil from the oil duct to the annular space between the stationary cooling lance and the rotatable rotor shaft.

* * * * *